3,126,444
WIRING DUCT

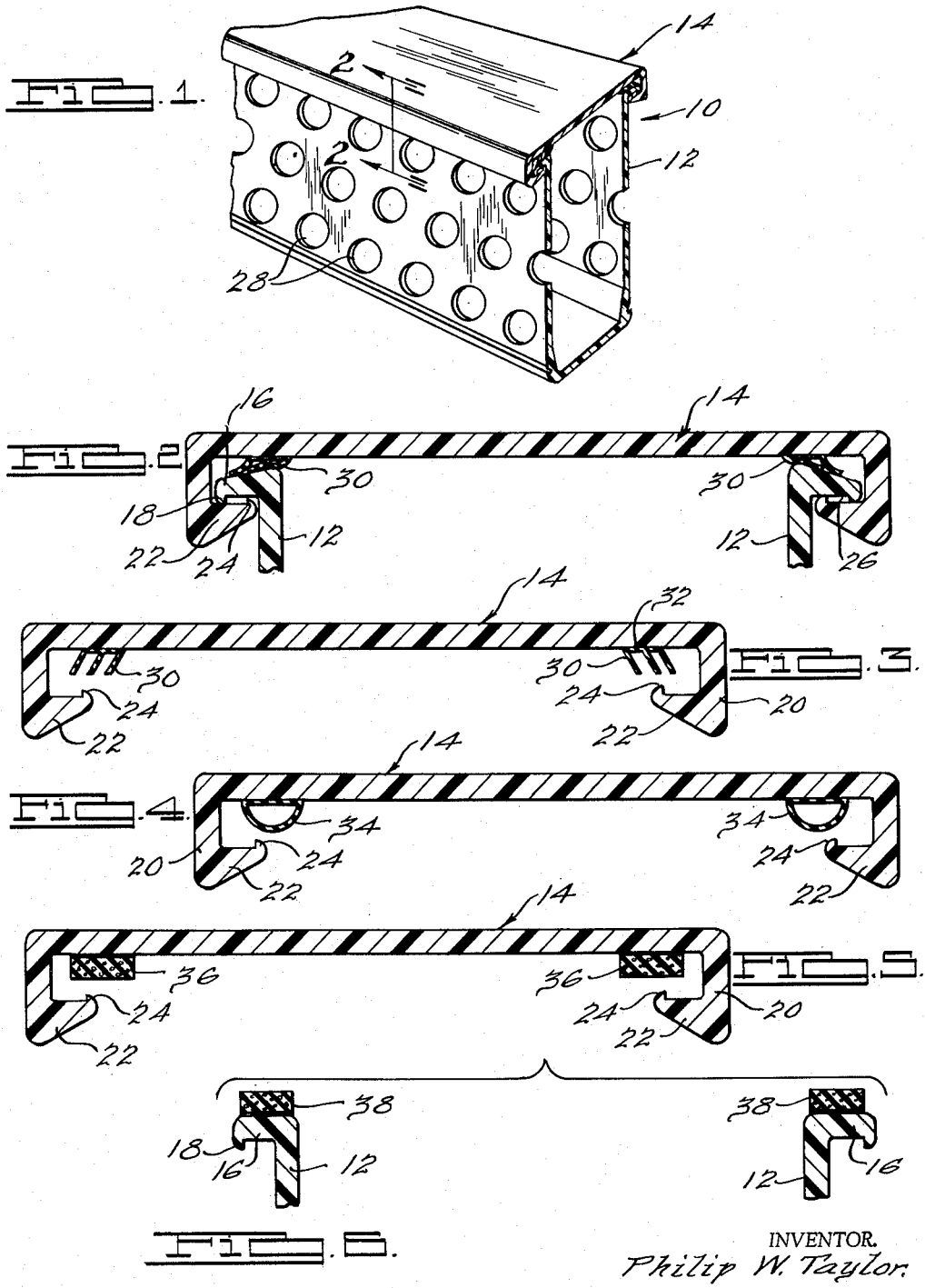

Philip W. Taylor, Howell, Mich., assignor to Taylor Plastics, Incorporated, Howell, Mich., a corporation of Michigan
Filed Aug. 15, 1962, Ser. No. 217,147
6 Claims. (Cl. 174—101)

This invention relates to wiring ducts, sometimes called wiring grilles, of the type used in electrical equipment for supporting bundles of conductors and for permitting individual wires of the bundle to be routed to and from the various elements which are wired.

The wiring duct of the present invention may be formed of metal, rubber, plastic or other suitable material. Plastic material of extruded section is preferred, but my improvement is not limited to any particular material.

These ducts may be disposed vertically, horizontally or in slanted position. Frequently the duct is literally crammed with wires and difficulty is experienced in maintaining the duct cover in place, there being a tendency for the cover to "pop off" because of bulging of the sides of the channel portion of the duct.

Another disadvantage of conventional ducts appears when the duct is disposed in vertical position and the duct is not full of wires. Under this condition, the cover frequently slides downwardly and leaves a portion of the duct uncovered.

It is therefore the object of my invention to provide an improved wiring duct which avoids the aforesaid difficulties, yet which may be manufactured at only slightly greater cost than the ducts now in use.

For an understanding of my invention, reference is made to the following specification and to the accompanying drawings which illustrate preferred forms of the invention. In the drawings, in which reference numerals have been used to designate like parts referred to in the specification:

FIG. 1 is a fragmentary perspective view, partly in section, of one form of my improved wiring duct;

FIG. 2 is a partial section, on an enlarged scale, of the FIG. 1 duct, taken as indicated by the line 2—2 on FIG. 1;

FIG. 3 is a view of the cover only of the duct of FIGS. 1 and 2;

FIGS. 4 and 5 are similar views of modified forms of covers; and

FIG. 6 is a partial section of a modified form of duct body section.

Referring now to FIGS. 1–3 inclusive, it will be seen that my improved duct 10 consists of a channel-shaped body 12 and a cover 14. The particular duct shown is formed of plastic material by extrusion and is flexible to a limited degree. The body 12 has a base and sides as shown, and the top portions of the sides are formed with outwardly extending flanges 16, each having a downwardly extending lip 18.

The cover 14 is adapted to interlock with the body channel and is provided with peripheral side portions which extend downwardly and inwardly as indicated at 20 and 22 respectively. A lip 24 is provided on each portion 22 and extends upwardly toward the top web of the cover. It will be understood that the terms "upwardly," "downwardly," "inwardly," etc., are used in a relative sense only.

It will be seen from FIG. 2, that when the cover 14 is in place on the body 12 (the cover is slid on longitudinally or snapped over the flanges 16 as desired), the lips 18 and 24 are in contact with the adjacent surface of the other member of the assembly, but are not necessarily interlocked with each other. There is a space 26 which permits some bulging of the cover or the sides of the channel as might be caused by overloading of the duct with a greater than normal bunch of wires. The sides of the body may or may not be provided with apertures or slots such as 28 to permit the routing of individual wires.

Bulging of the cover or the body of the duct to an appreciable degree will cause the lips 18 and 24 to engage or interlock and the cover will be retained against coming off. The cover is easily removed when desired by sliding it longitudinally or by bending the portions 22 downwardly as permitted by the flexibility of the material.

Referring still to FIGS. 1–3 inclusive, another feature of my invention resides in the provision of the flexible fingers 30 on the inner surface of the web of the cover 14. These fingers may be of the same material as the cover and may be integral therewith, but as shown, are formed as part of a separate element 32 cemented or otherwise secured to the cover as illustrated. The fingers 30 are disposed in such position that they engage the top surface of the respective flange 16 when the cover is in place. The flanges 16 are shown as having a sloping top surface, but such is preferred rather than necessary. The fingers 30 function as friction elements and engage the flanges 16 with sufficient force to effectively prevent sliding of the cover when the duct is disposed vertically or on a slant. They do not interfere with the placing or removal of the cover and may be continuous through the length of the cover or may be in spaced lengths therealong.

FIG. 4 shows a modification of the cover wherein the fingers 30 have been replaced by the hollow flexible elements 34. The latter may be half sections of flexible tubing or the like and, when the cover is placed in position, will be slightly compressed and act as friction members similarly to the fingers 30.

FIG. 5 shows another modification wherein strips 36 of sponge rubber, urethene or the like, are used as a friction element.

FIG. 6 shows strips 38 similar to the strips 36, but adhered to the flanges 16 of the body channel instead of to the cover.

The elements 32 of FIG. 3 or the elements 34 of FIG. 4 may, of course, be used in FIG. 6 if desired.

Thus it will be seen that I have shown an improved wiring duct having novel and useful features not shown in the prior art; and while particular embodiments of the invention have been described and illustrated, it will be apparent that changes and modifications may be made without departing from the spirit or scope thereof as set forth in the appended claims.

I claim:

1. A wiring duct comprising, in combination, a body of flexible material having a channel shape, the top edge of each of the sides of said body having an outwardly extending flange terminating in a downwardly extending lip, a removable cover of flexible material adapted to close the open side of said body, said cover having downwardly extending side portions with inwardly extending flanges thereon, said flanges each terminating in an upwardly extending lip, the disposition of the juxtaposed lips on said body sides and on said cover being such that they are laterally spaced when said cover is in place and are adapted to interlock in response to bulging of said cover or said body thereby to resist removal of said cover.

2. The combination set forth in claim 1 wherein the sides of said body are provided with openings permitting routing of individual wires therethrough.

3. The combination set forth in claim 1 including friction means disposed between said cover and said body sides for resisting sliding of said cover in said body.

4. The combination of claim 3 wherein said friction means is disposed between said cover and the flanges on said body sides.

5. The combination of claim 1 including friction means carried by said cover and adapted to engage the flanges on said body sides when said cover is in place.

6. The combination of claim 1 including friction means carried by said body side flanges and adapted to engage said cover thereby to resist sliding of said cover.

References Cited in the file of this patent

UNITED STATES PATENTS

| | | |
|---|---|---|
| 1,998,791 | Schanz | Apr. 23, 1935 |
| 2,047,977 | McGowan | July 21, 1936 |
| 2,188,815 | Murphy | Jan. 30, 1940 |
| 3,055,536 | Dieny | Sept. 25, 1962 |

FOREIGN PATENTS

| | | |
|---|---|---|
| 637,988 | Great Britain | May 31, 1950 |

OTHER REFERENCES

Electronic Design, page 37. Copy in Div. 75. April 16, 1958.